US006965848B2

(12) United States Patent
Ballus

(10) Patent No.: US 6,965,848 B2
(45) Date of Patent: Nov. 15, 2005

(54) DUCTING SYSTEM DESIGNER

(75) Inventor: Thomas A. Ballus, Leeds (GB)

(73) Assignee: Dansk Industri Syndikat A/S, Herlev (DK)

(*) Notice: Subject to any disclaimer, the term of this patent is extended or adjusted under 35 U.S.C. 154(b) by 842 days.

(21) Appl. No.: 09/734,968

(22) Filed: Dec. 12, 2000

(65) Prior Publication Data
US 2002/0107671 A1 Aug. 8, 2002

(51) Int. Cl.$^7$ ................................................ G06G 7/50
(52) U.S. Cl. .......................... 703/9; 454/231; 700/29; 700/103
(58) Field of Search ............................... 700/276, 182, 700/28–32, 97–103; 137/561 A; 703/2; 236/13

(56) References Cited

U.S. PATENT DOCUMENTS

| | | | | |
|---|---|---|---|---|
| 4,095,350 A | * | 6/1978 | Wanderman | 434/72 |
| 4,551,810 A | * | 11/1985 | Levine | 700/182 |
| D289,414 S | * | 4/1987 | Peters et al. | D18/7 |
| 4,924,913 A | * | 5/1990 | Pedersen | 138/155 |
| 5,167,468 A | * | 12/1992 | Crafton | 405/155 |
| 5,439,402 A | * | 8/1995 | Dai et al. | 440/47 |
| 5,587,563 A | * | 12/1996 | Yazici et al. | 181/224 |
| 6,041,171 A | * | 3/2000 | Blaisdell et al. | 703/6 |

OTHER PUBLICATIONS

Howe et al., "A Network-based Kit-of-parts Virtual Building System" Universitiy of Michigan 1997. p. 691–706.*

* cited by examiner

Primary Examiner—Kevin J. Teska
Assistant Examiner—Tom Stevens
(74) Attorney, Agent, or Firm—Friedrich Kueffner

(57) ABSTRACT

A method and means for automating the design of a ducting system for a fluid is proposed. Boundary data identifying boundary conditions of the ducting system, which boundary data comprises positional information in a three dimensional installation space and magnitude of partial fluid flow for each of at least one component terminal connection, through which fluid is exchanged with the ducting system, and positional information of at least one main terminal connection, at which the partial fluid flows are converging, is entered into a data processing system. Design data is determined by applying an optmization algorithm to the boundary data using the data processing system, which design data comprises an optimum layout of said ducting system and an identification of all required ducting components for building the ducting system, selected from a collection of standard ductwork primitives, and the data processing system communicates the design data to an external recipient.

22 Claims, 14 Drawing Sheets

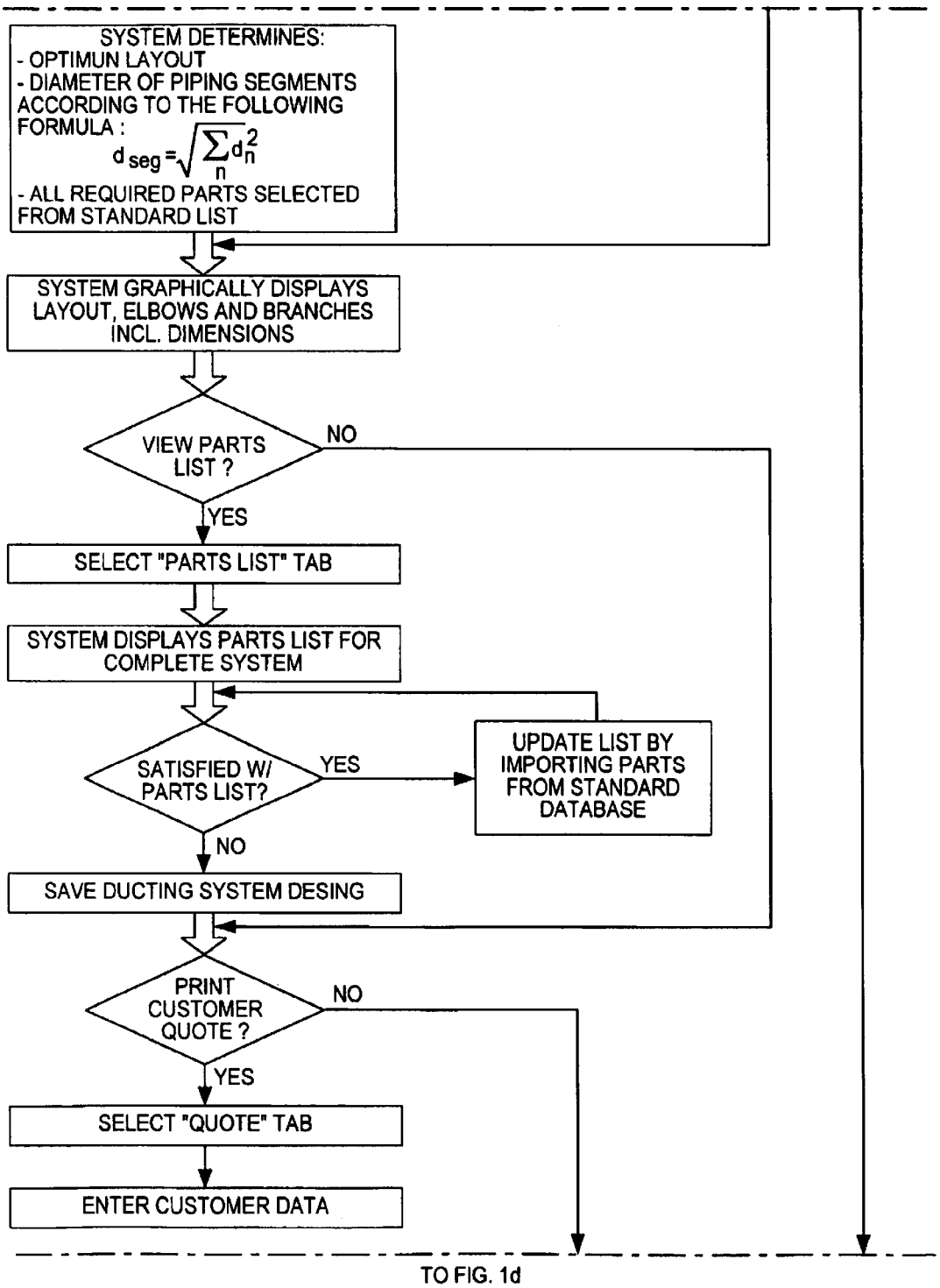

FIG. 11

| | | NORFAB QUICK-FIT | | |
|---|---|---|---|---|
| 5 | 3200-0400-10000 | PIPE 4"QFX59.25"LONG GA | 15 | 15 |
| 1 | 3200-0600-10000 | PIPE 6"QFX59.25"LONG GA | 19.3 | 19.8 |
| 1 | 3200-0800-10000 | PIPE 8"QFX59.25"LONG GA | 27.3 | 27.3 |
| 2 | 3200-0900-10000 | PIPE 9"QFX59.25"LONG GA | 29.5 | 59 |
| 3 | 3200-1000-10000 | PIPE 10"QFX59.06"LONG GA | 31.8 | 95.4 |
| 4 | 3202-0400-10000 | ADJ NIPPLE W/O-RING 4"QF GALV | 8.5 | 34 |
| 1 | 3202-0600-10000 | ADJ NIPPLE W/O-RING 6"QF GALV | 9 | 9 |
| 1 | 3202-0800-10000 | ADJ NIPPLE W/O-RING 8"QF GALV | 11 | 11 |
| 1 | 3202-0900-10000 | ADJ NIPPLE W/O-RING 9"QF GALV | 11.61 | 11.61 |
| 1 | 3202-1000-10000 | ADJ NIPPLE W/O-RING 10"QF GALV | 11.81 | 11.81 |
| 2 | 3210-0460-104000 | ELBOW4"60DEG. QF 1.0CLRGA | 26.4 | 52.8 |
| 1 | 3210-0490-104000 | ELBOW4"90DEG. QF 1.0CLRGA | 26.4 | 26.4 |
| 1 | 3210-0660-106000 | ELBOW4"60DEG. QF 1.0CLRGA | 35.21 | 35.21 |
| 1 | 3220-0660-10400 | BRANCH A=08 B=06 C=04 | 64.5 | 64.5 |
| 1 | 3220-0904-10800 | BRANCH A=09 B=04 C=08 | 67.5 | 67.5 |
| 1 | 3220-1004-10900 | BRANCH A=10 B=04 C=09 | 72 | 72 |
| 3 | 3240-0400-10000 | BLAST GATE 4" QF GALV. | 25 | 75 |
| 1 | 3240-0600-10000 | BLAST GATE 6" QF GALV. | 34.21 | 34.21 |
| 16 | 3260-0400-10000 | CLAMP W/PIN QF 4" GALV. | 5.41 | 86.56 |

NORFAD INC.
150 TRANSIT AVE.W., P.O. BOX 429
THOMASVILLE, NC 27361-0429
ATTN: CONTACT PERSON
PHONE: (555) 555-5555
FAX: (555) 555-5555
E-MAIL: CONTACT@NORFAD.COM
WWW.NORFAB.COM

CUSTOMER DELIVERY ADDRESS
ADDRESS LINE 1
ADDRESS LINE 2
ADDRESS LINE 3
ADDRESS LINE 4

RESELLER FIRSTNAME LASTNAME
ADDRESS LINE 1
ADDRESS LINE 2
ADDRESS LINE 3
ADDRESS LINE 4

QUOTE PRICE $1,393.92

NEW DESIGN | OPEN DESIGN | SAVE DESIGN | DRAW DESIGN | DROP | TEXT LABEL | SELECT MODE | INPUT DIALOG | PRINT | HELP

DUCTING SYSTEM DESIGNER

The present invention relates to a method and means for automating the design of a ducting system, providing for fluid exchange between at least one component location and at least one main location in a three dimensional installation space. This method and means find particular utility in the heating and ventilation industry, i.e. in the design and the logistics of installation of exhaust air or fresh-air ducting, air-conditioning ducting, and in the field of conveying fluidized particulate materials, and in which industry and in which field custom designs of ducting systems are required on a job-by-job basis.

Such design means are for example described in U.S. Pat. No. 4,551,810, which relates to a system for at least partially automating the design of a heating and ventilation ductwork. The system provides the user with a computer based design tool for devising a customized ducting system, requiring the user to enter detailed information on all components constituting the ducting system like tube elements, elbow pieces allowing turns in the pipeline system, and others. Therefore, in addition to positional and orientational information of the components, dimensional information like diameter values of the tubes, bending radii defining turns in the pipeline system and various other data points relating to the shape of the parts have to be communicated to the computer system for each single ducting component via a graphical interface. Based on this input and on stored information defining underlying dimensions of the material used to fabricate the ducts, the computer system then determines how to best fabricate the ducting system components in the machine shop as required by the design.

This system, however, only automatically provides the user with information relating to the design and the manufacture of single ductwork components within the overall ducting system. In order for the system to start its routine the user needs to supply detailed dimensional information of the ducting components including throughput requirements of the pipeline segments. This information needs to be generated by a qualified system expert skilled in the art of ducting system design, after devising the layout of the overall ducting system. Therefore, the above system only provides automation for a single step in the overall process of designing a ducting system, which is still a difficult, tedious, time consuming process, prone for errors and can only be conducted by a system expert. Typically, this system expert performs this design work at a location other than the location at which the ducting system is to be installed, while a field installation representative supplies the necessary information about the installation site. This process periodically leads to miscommunication about the requirements of the installation site, resulting in inappropriate designs.

Other systems used in the industry provide similar functions as the system described above and are based on AutoCAD drawings of the pipeline layout, which have to be generated by the user. AutoCAD design systems are highly sophisticated computerized drafting tools, which are both costly to acquire and complex to operate. This makes it even harder for a representative at the installation site, who has less than expert knowledge in the design of ducting systems, to make use of these systems.

Due to above drawbacks in the prior art, it is the object of the present invention to provide a method and means for automating the design of a ducting system for a fluid, which produce quick results, are easy to use, robust against operator errors, and can be utilized even by individuals lacking thorough technical expertise on ducting system design.

This object is achieved by the present invention, according to which a method for automating the design of a ducting system for a fluid comprises the steps of entering boundary data, identifying boundary conditions of the ducting system, into a data processing system, which boundary data comprises positional information in a three dimensional installation space and magnitude of partial fluid flow for each of at least one component terminal connection, through which fluid is exchanged with the ducting system, wherein the fluid flow through said at least one component terminal connection has a common orientation, and positional information in the three dimensional installation space of at least one main terminal connection, through which the total fluid flowing through the at least one component terminal connection is routed, determining design data by applying an optimization algorithm to said boundary data using said data processing system, which design data comprises an optimum layout of said ducting system in the three dimensional installation space including an identification of all required ducting components for building the ducting system, selected from a collection of standard ductwork primitives, and having said data processing system communicate the design data to an external recipient The present invention is based on the insight, that the cause of the design processes disclosed in the prior art being difficult, slow, prone for errors, and requiring an operator of considerable technical expertise is due to the lack of full automation. In fact, the computer automates only certain steps of these design processes, while others are at most computer based, but require active design activity of the user. The present invention, however, is able to provide a fully automated design process. This is made possible through the insight that the design of a ducting system is fully determined by supplying the coordinate information of the component terminal connections, representing the locations, at which e.g. tools requiring air extraction are positioned, the magnitude of partial fluid flow through each of these connections, and the coordinate information of the at least one main terminal connection, representing the location, at which the total fluid flow from the component terminal connections is converging, if a database containing a collection of standard ductwork primitives and optimization criteria are provided, and the fluid flow through the component terminal connections has a common orientation. This set of input data allows the full automation of the design process, resulting in an optimum layout of the ducting system and a list containing all required components selected from the database of ductwork primitives for building the desired ducting system.

It is advantageous, if the boundary data entered into a data processing system contains a uniform fluid velocity value, corresponding to a uniform desired flow speed of the fluid in all parts of the ducting system. By defining a uniform flow speed in all segments of the ducting system, formation of turbulence in the fluid, which appears at transition points between pipeline segments of different flow speeds, is prevented to the greatest possible extent. This way, wear and tear of the ductwork is minimized, resulting in a longer life span of the ducting system. Additionally, the absence of turbulence also reduces the energy needed to drive the fluid through the ducting system, making the operation more cost effective. By specifying the value of the uniform flow speed, the data processing system is able to calculate the required diameter of the respective tube providing a component terminal connection, if the user specifies the rate of air volume to be routed through this component terminal connection. This adds to the automation of the design process, relieving the user from manual calculations Further, it is practical, if said boundary data contains information determining the common orientation of the fluid flow through said at least one component terminal connection. This way the system can, depending on fluid orientation, optimize fluid flow through the ductwork by customizing the respective layout and the choice of ducting components.

In addition, it is advantageous, if the required throughput capacity of at least one pipe element, which is contained in the required ducting components, is calculated by the data processing means considering the position of the pipe element within the optimum layout of the ducting system and the magnitude of the partial fluid flow for each of the at least one component terminal connection, while a uniform desired flow speed of the fluid in all parts of the ducting stem is assumed. This function further automates the design process of the ducting system, enhancing the process in terms of speed and user friendliness, making it even easier for a user with little expertise in ducting design to operate.

Another benefit is achieved, if the boundary data contains information identifying a z-dimension, corresponding to the height of a trunk plane above the floor level of the three dimensional installation space, which floor level is defined by the x- and y-axis of the coordinate system and in which trunk plane a trunk pipe system is configured, which provides connections to one main terminal location and at least one drop, which is the location defined by the projection of the at least one component terminal connection along the z-axis into the trunk plane. As building restrictions often do not allow an arbitrary layout of the ducting system in the three dimensional space, it is beneficial to access the component terminal connections via drop tubes oriented along the z-axis and connecting the drop tubes to the man terminal via a trunk pipe system in a plane parallel to the xy-plane. This way the pipeline system can e.g. be positioned in close proximity to the ceiling or the floor of a room, optimizing the use of its space.

Further, it is practical to determine the optimum layout of the ducting system by optimizing the configuration of the trunk pipe system, which contains at least one straight trunk pipe, wherein the orientation allowed for said at least one trunk the directions of the x- and the y-axis of the coordinate system. This way, the number of parts, which need to be provided by the standard ductwork database, is reduced, as e.g. branches and elbows only have to be made available in versions providing 90 degree turns versus providing any arbitrary turn, facilitating manufacturing and logistics of shipping these parts, therefore reducing the total cost of the ducting system. Also, the building requirements often favor an orthogonal layout of the ducting system.

Additionally, it is advantageous, if the optimization algorithm to determine the optimum layout of the trunk pipe system comprises the steps of dividing the drops into two drop groups according to the location of drops relative to the main terminal location in x-direction, dividing each drop group into two side groups according to the location of drops within the drop groups relative to the main terminal location in y-direction, applying a subdividing routine for subdividing input groups into at lest one output group to eat side group, while the output group is named level 1 group, by assigning each drop separated from any other drop within the same input group by a distance of equal or less than a predetermined parameter to individual output groups, determining a group center coordinate for each output group by averaging the coordinates of the drops contained in the output for each output group by averaging the coordinates of the drops contained in the output group, iteratively applying the subdividing routine to the at least one output group of the respective prior routine, as long as a pair of drops separated by a distance equal or less than a respective parameter value, which is supplied from a list of predetermined parameters of decreasing value, exist, obtaining a layout A of the trunk pipe system by applying a routine or laying out the pipelines comprising the steps of laying out horizontal pipelines originating from the main terminal location in both directions, providing branching points to vertical pipelines, connecting the at least one level 1 group to the trunk pipe system, while the vertical pipelines are positioned is such way, that their pathways include to the vertical pipelines, connecting the single drops to the trunk pipe system either directly or via branching points of further group level distribution systems, providing access to the remaining drops via a grid of orthogonal pipelines, while the pathways of the orthogonal pipelines include the group center coordinates of the remaining groups, selecting the optimum layout of the trunk pipe system by choosing the layout providing the shorter total length of all pipeline segments between layout A of the trunk pipe system and layout B obtained by rotating the design area 14 by 90 degrees, configuring the pipes according to the routine for laying out the pipelines, and rotating the design area 14 back by 90 degrees Through the use of this optimization algorithm the cost of the overall ducting system is minimized, as the total path length of the ducting system is reduced by assigning the drops to groups, which utilize a single connection pipe to the remaining ducting system, versus connecting each drop separately. The total path length is further reduced by making a selection between layout A and layout B.

It is also practical to allow for any aspect of the design data, if needed, to be modified through a user interface, after the design data is determined by the data processing system. This makes the ducting system customizable to individual requirements of the installation site and several configurations can be compared regarding prize and layout.

Further, it is advantageous to communicate the design data to an external recipient through a visual display of the geometry of the optimum layout to scale to the physical layout of the desired ducting system including visualizations of at least one elbow device if required by the layout, each of which is interfacing a pair of pipe elements of different orientations, and of at least one branching device if required by the layout, each of which is connecting at least three pipe elements. These visualizations make the process more user friendly and easier to use for a person, not familiar with ducting system design, as the results can be evaluated more quickly.

Additionally, it is practical to communicate the design data to an external recipient via a visual display of a list of the required ducting components including their prices, which list is based on a visual display of the optimum layout. This display of a list makes the process even more user friendly and quick to evaluate.

Further, it is advantageous, if the method for automating the design of a ducting system can be utilized via the Internet through the use of web browsing software. This feature further adds to the user friendliness of the method, as the computer program can be used at any location with an Internet connected computer. This way, the program can normally be run directly at the site, which the ducting system is to be installed at. Also, the operation via the Internet always provides the user with the latest software and database update of the program, which is not the case if the program is operated on a self contained portable computer.

The present invention will be described in greater detail in the following with reference to the drawings, in which FIG. 1a through 1d show a flow chart illustrating a computer program for automating the design of a ducting system in accordance with the present invention.

FIG. 11 shows a purchase order for a ducting system as generated by computer software in accordance with the present invention.

Figure 1A:
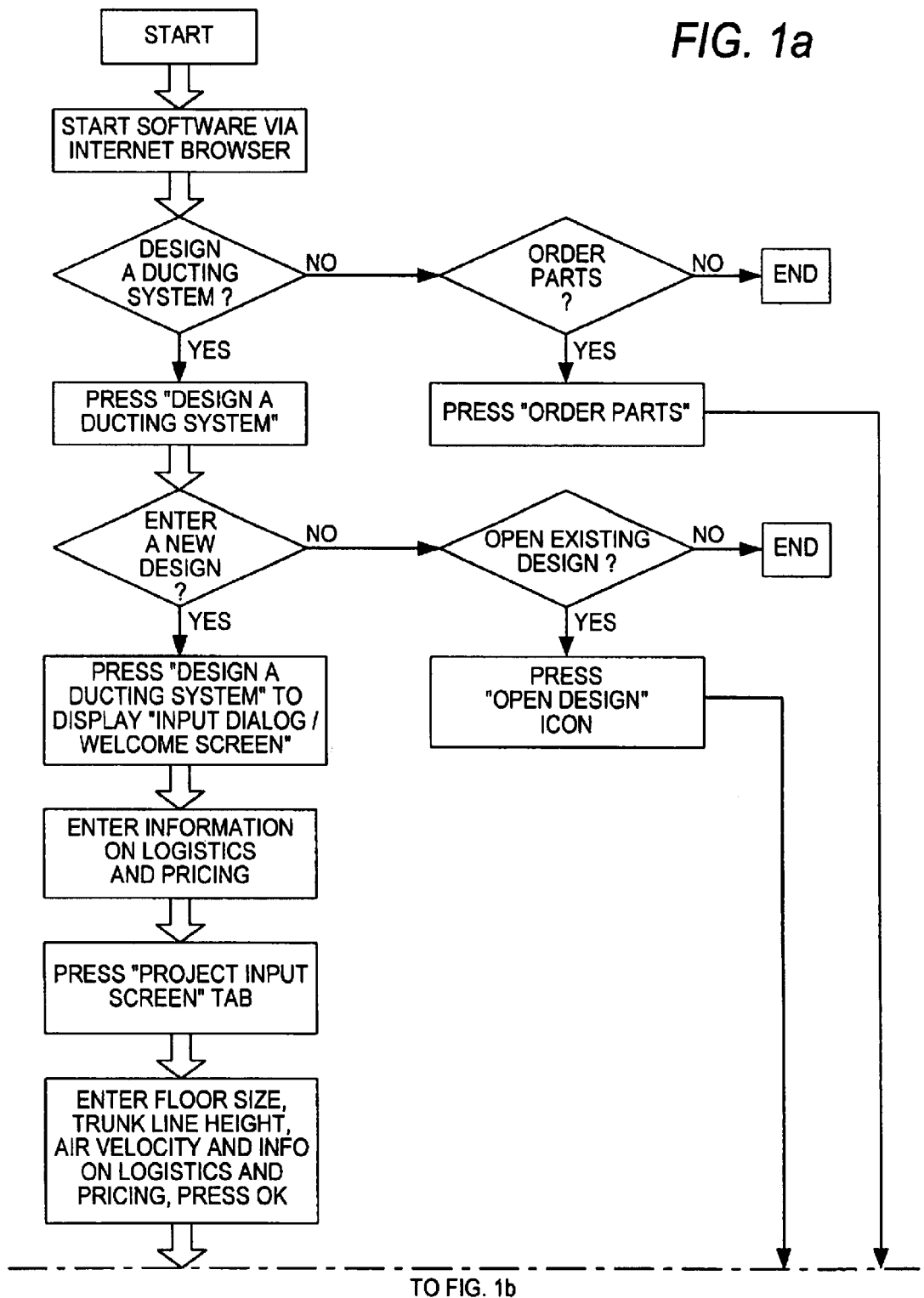
Figure 1B:
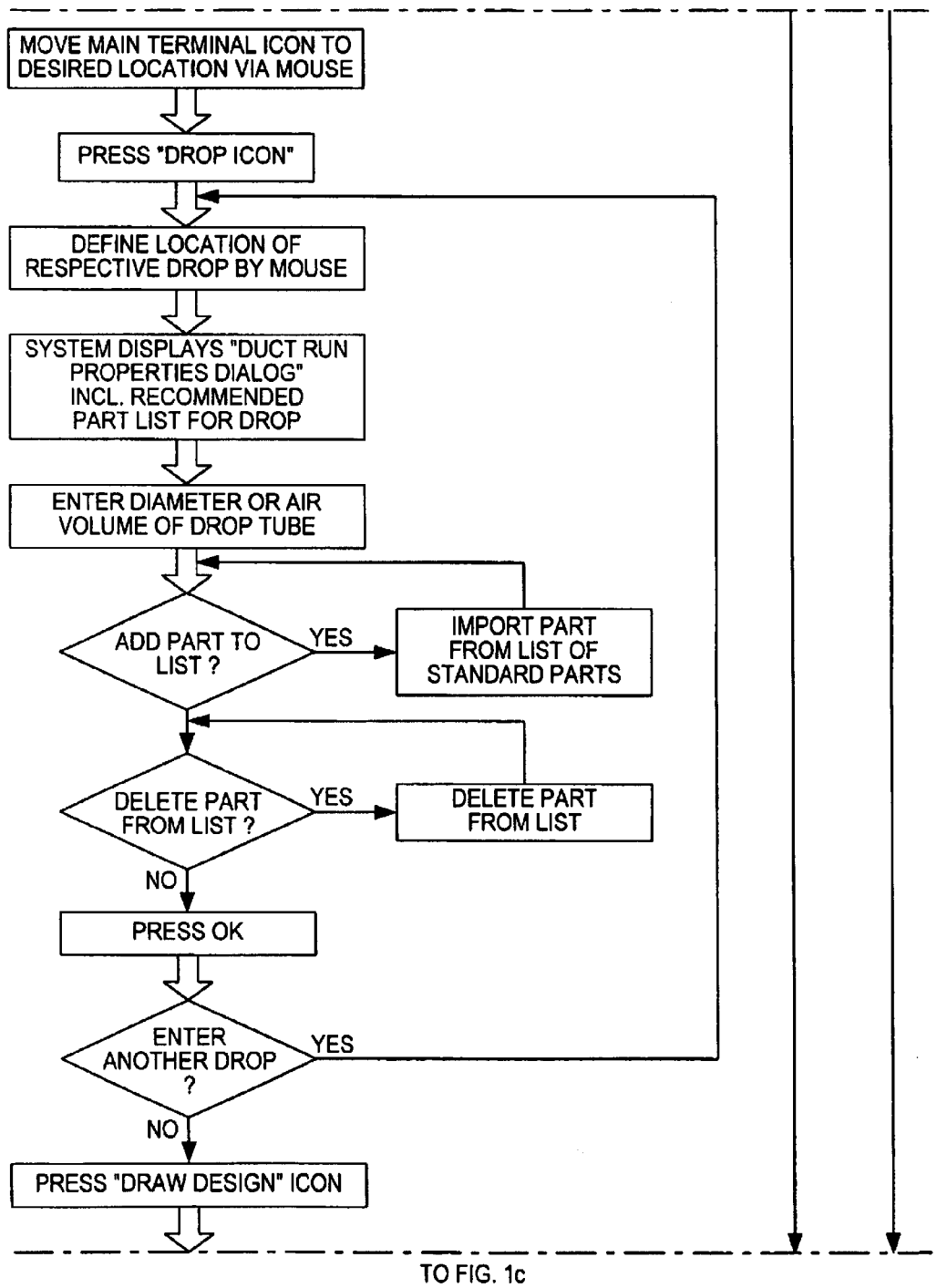
Figure 1D:
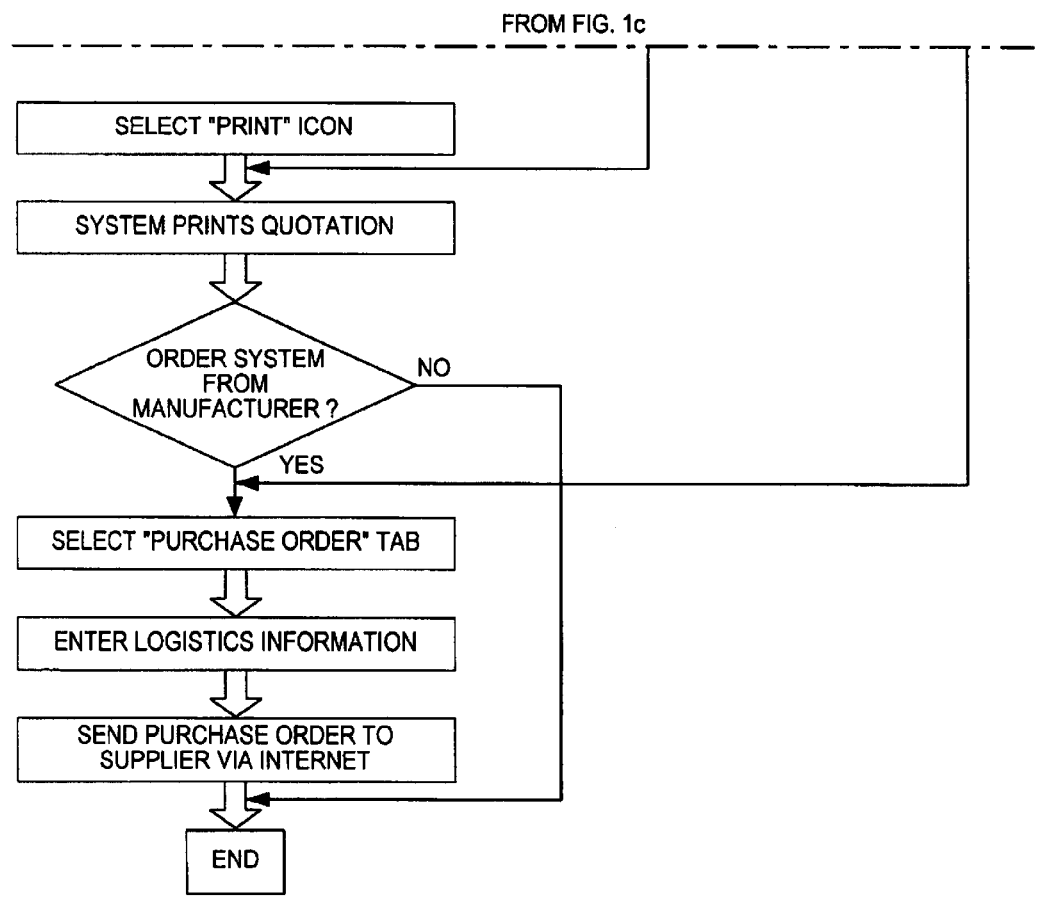
Figure 2:
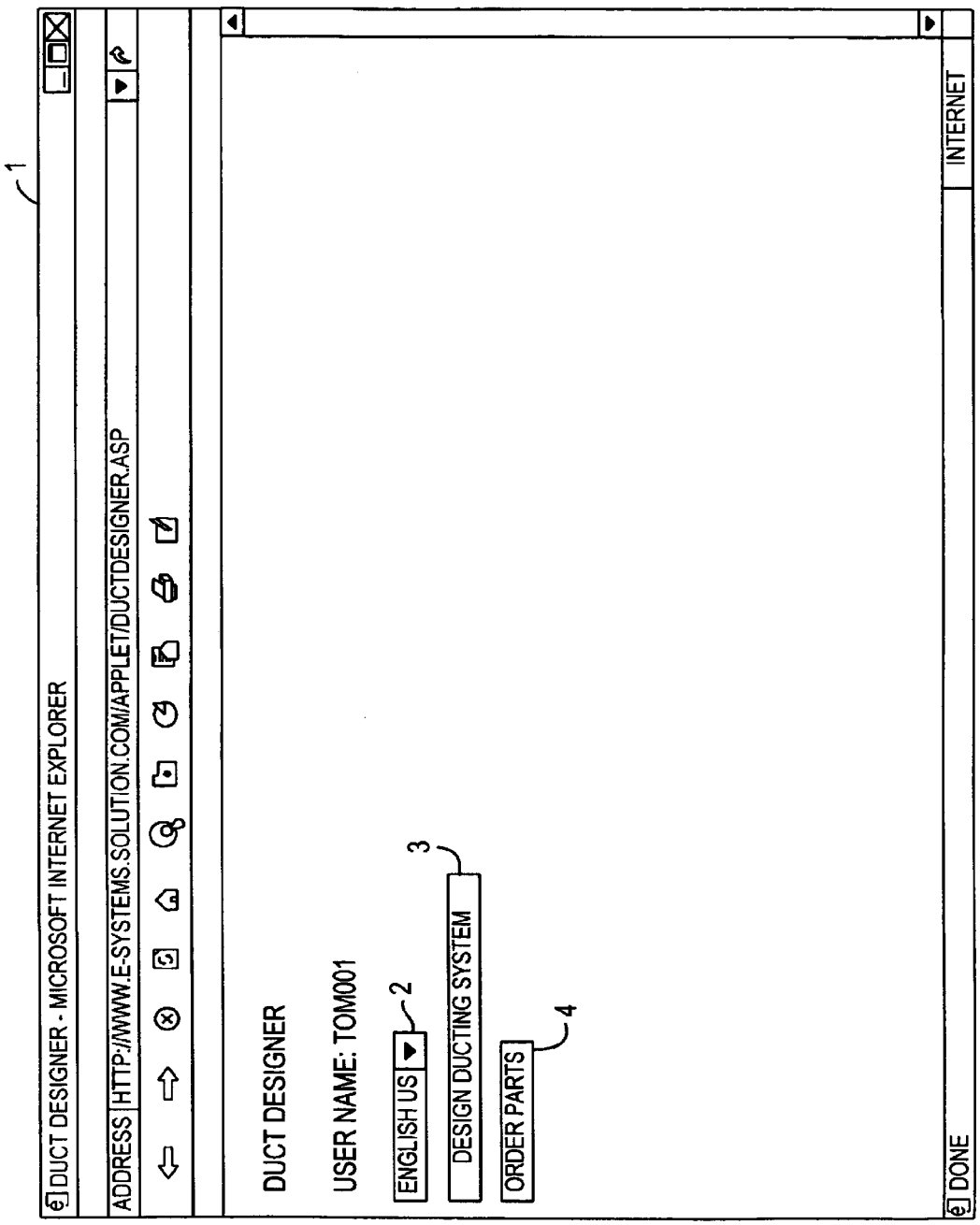
FIG. 2 is the start screen of the computer program illustrated in FIG. 1.
Figure 3:
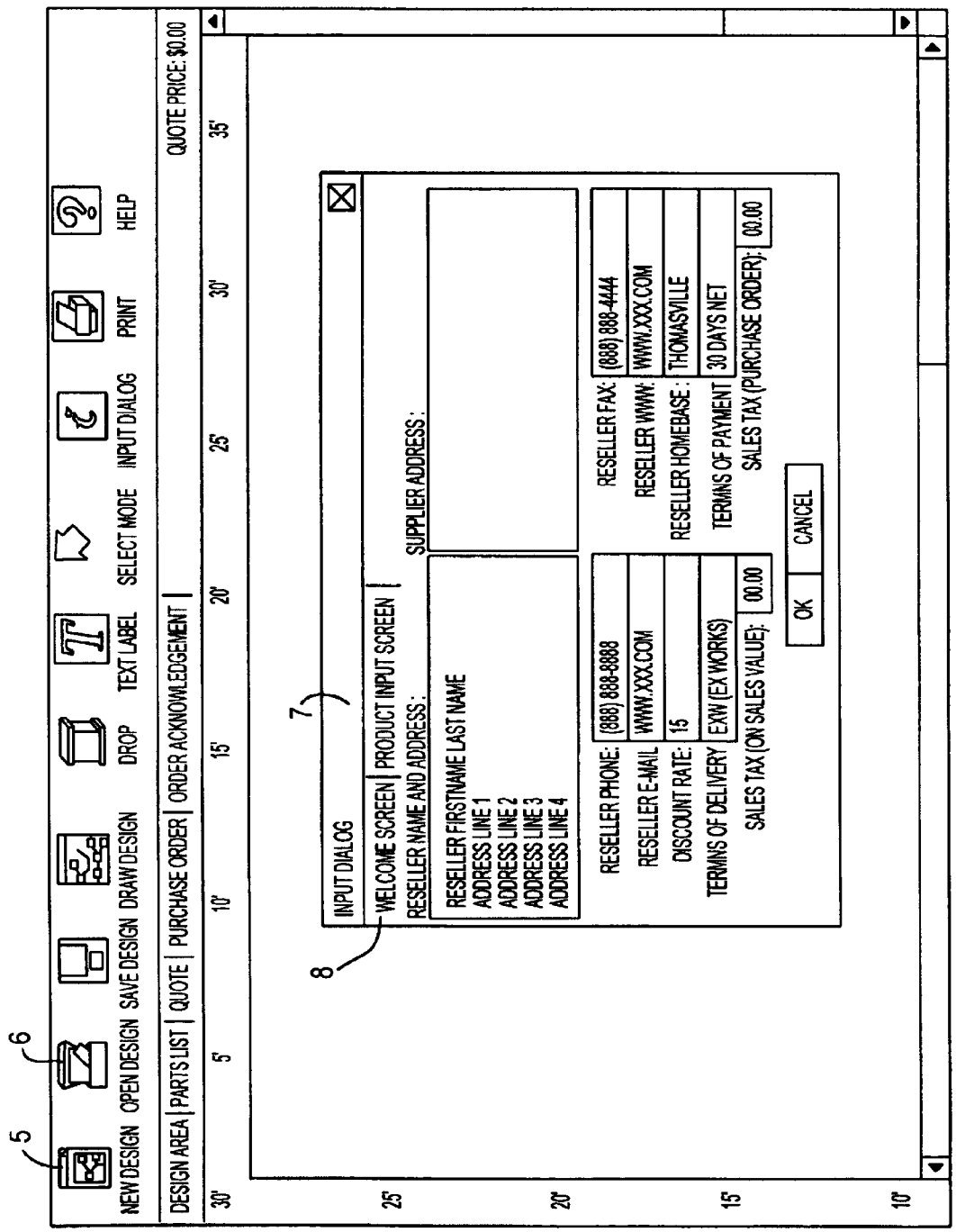
FIGS. 3 and 4 show dialog screens of the computer program illustrated in FIG. 1 for entering input data.
Figure 4:
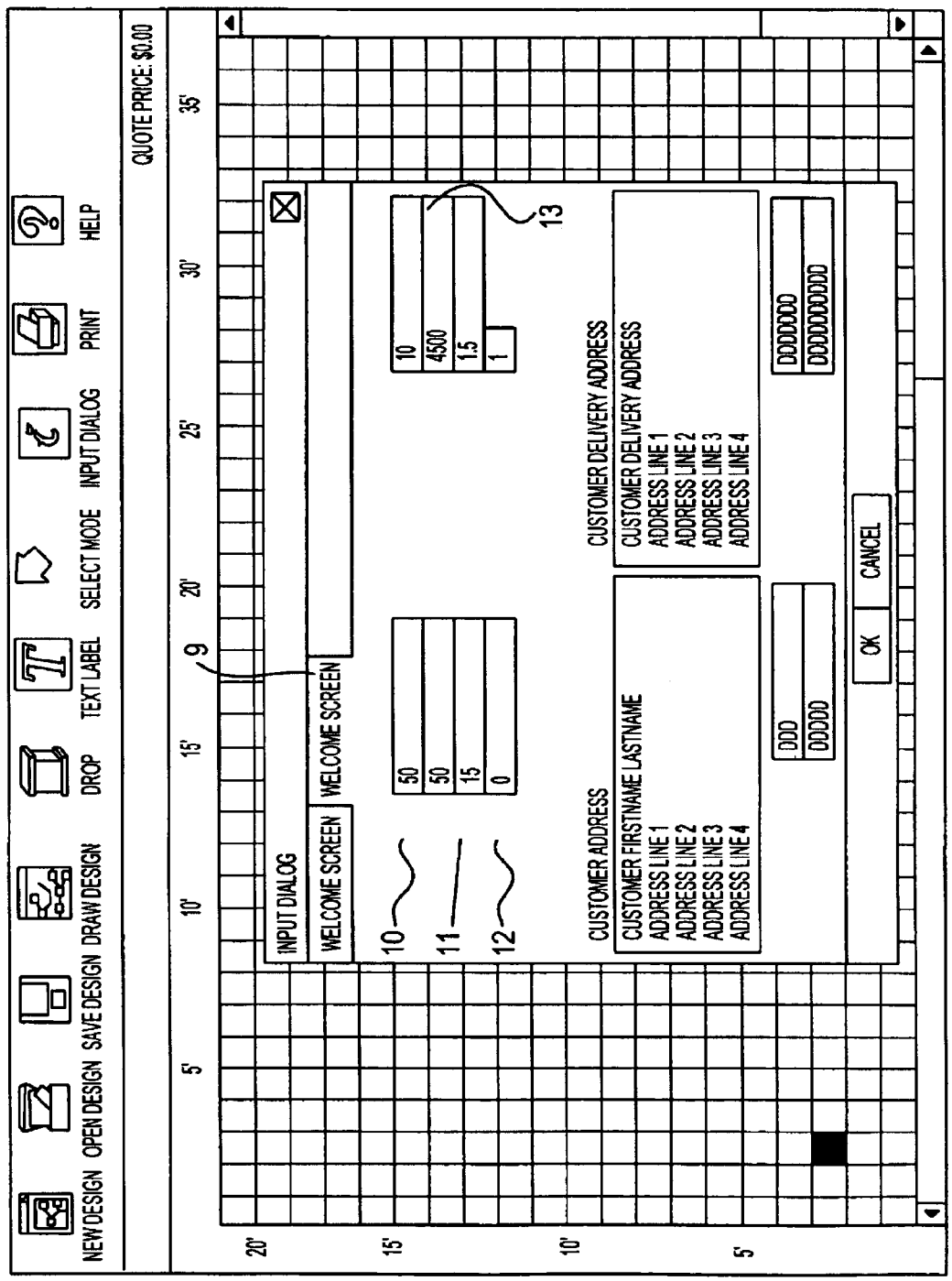

A computer program employing the algorithms depicted in the flowchart of FIG. 1a through 1d can be used to automate the design of a ducting system in accordance with the present invention. The computer program can be accessed via the Internet using platform independent, like Java enabled, browsing software like Microsoft Explorer or Netscape Communicator. As shown in FIG. 2, in order to start the ducting software via an Internet connected computer, the respective Internet address 1 has to be entered in the address line of the Internet browser. After responding to user identification and password prompts, the user enters the start screen, which contains a language menu 2 for selecting the operating language of the program, and two buttons for executing functions. These buttons are a "Design a Ducting System" button 3, which enables the design function of the software, and an "Order Parts" button 4, which allows the user to skip the design function and go directly to a function for ordering parts from the manufacturer. After the design function of the software is activated, a menu bar containing a selection of icons is displayed in the upper portion of the screen as shown in FIG. 3. While an "Open Design" icon 6 gives access to a previously created ducting design, operating a "New Design" icon 5 brings up an "Input Dialog" window 7, containing a "Welcome Screen" 8 for entering information on logistics and pricing of hardware delivery and a "Project Input Screen" 9, which can be accessed by operating the respective tab and is displayed in FIG. 4. Here a length 10 and a width 11, representing the x- and y-dimensions of a three dimensional installation space, in which the ducting system is to be installed in, are specified by the user. Additionally, a trunk line height 12, corresponding to the height above the floor level of the installation space, at which a trunk pipe system 26 providing connections to a main terminal location 15 and to drop tube locations 18, drop tubes being vertical pipes connecting the trunk pipe system with component terminals, is installed, an air velocity 13 corresponding to a uniform desired flow speed of the air in all parts of the ducting system, and information pertaining to logistics of the hardware delivery have to be added.

Figure 5:
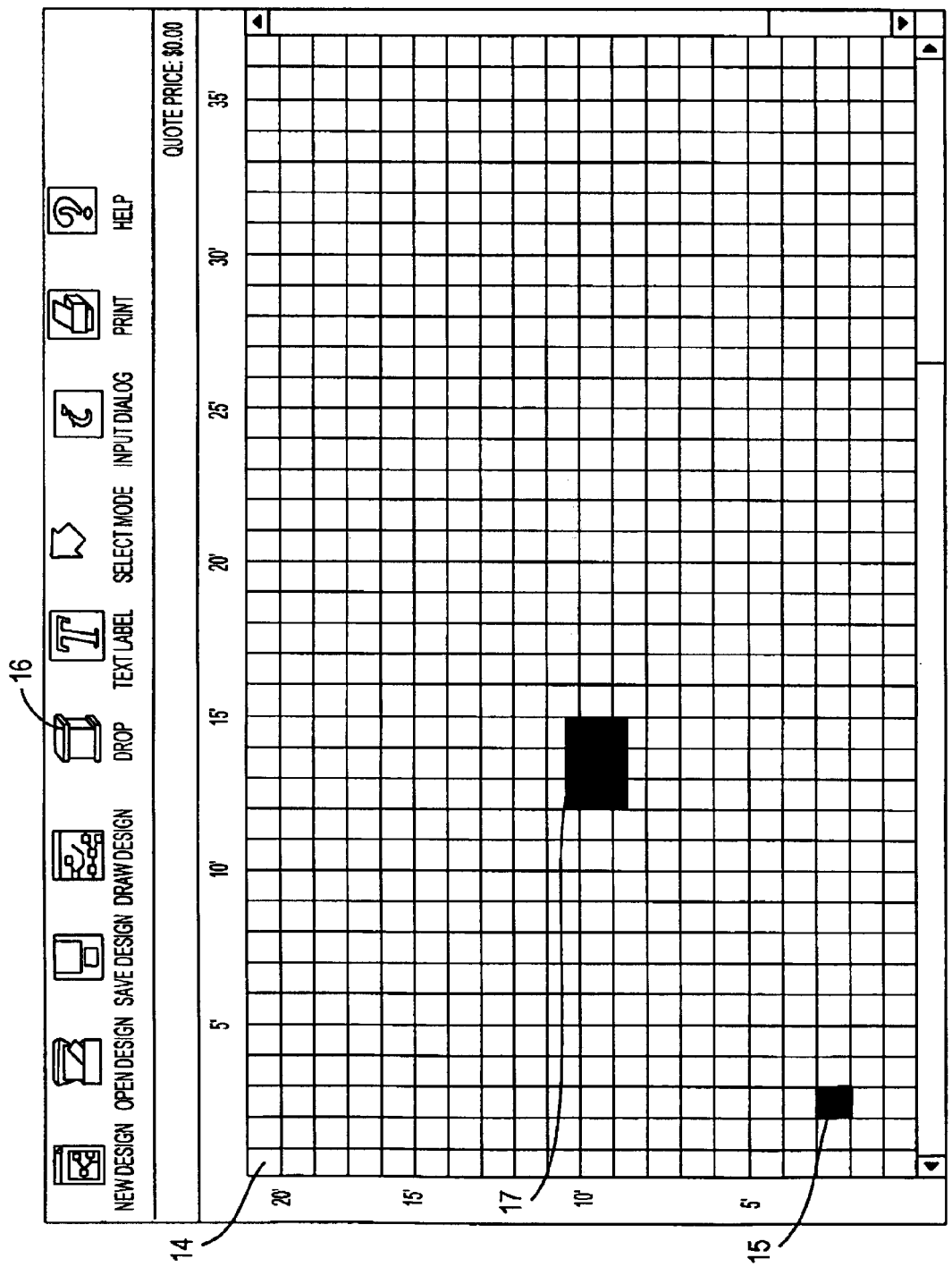
FIG. 5 shows the main terminal location and one drop tube location of a ducting system as displayed by computer software in accordance With the present invention

After completing the "Input Dialog" window 7, the design area 14, which is a two dimensional grid system representing the x- and y-dimensional layout of the installation space is displayed as shown in FIG. 5. In the lower left corner of this grid a graphical representation marks the main terminal location 15 of the ducting system. This is the location of the ducting system, at which the total fluid being exchanged with the system through the component terminals is converging. This means, if the system is for example configured to extract air from a range of machines on a factory floor, the sum of the single air flows from all machines is entering the main terminal. The other way around, if the system is supplying air to these machines, the main terminal is supplying the entire air flow. Now the main terminal location 15 within the design area 14 needs to be defined by moving the graphical representation to the desired coordinate location using the mouse of the computer.

Figure 6:
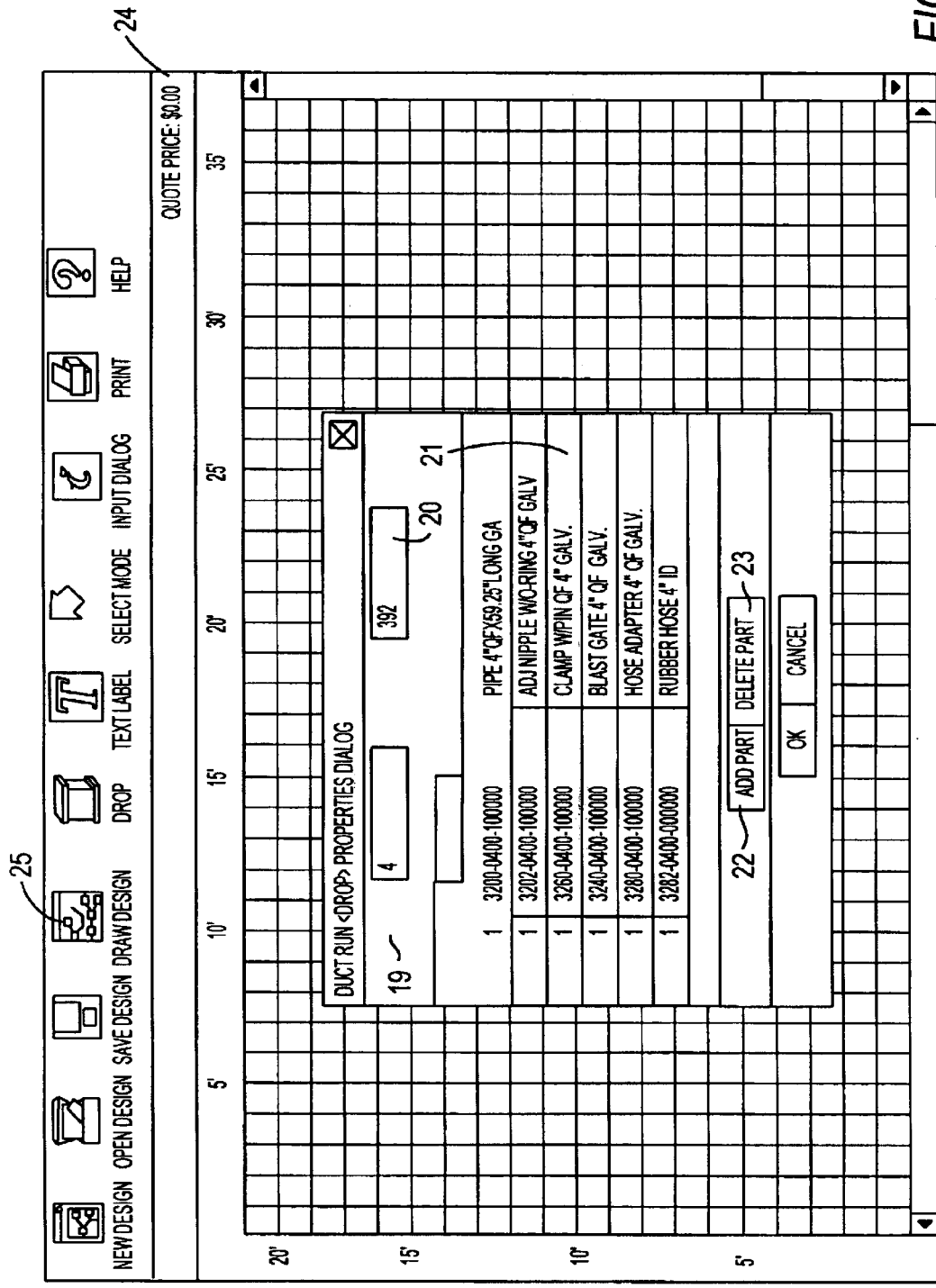
FIG. 6 shows a dialog screen of the computer program illustrated in FIG. 1 for editing parameters pertaining to a drop tube of the ducting system.

In the next steps the drop tube locations 17, which will be referred to as drops in the following, have to be defined. Therefore, the "Drop" icon 16 on the upper menu bar has to be operated. Using the computer mouse, the position of a first drop 17 then needs to be picked within the design area 14. Subsequently, as shown in FIG. 6, a "Duct Run Properties" dialog 18 appears, requiring the user to either specify a diameter 19 of the drop tube or an air volume 20, corresponding to the rate of air volume $V_R$ passing through that drop tube. In case the rate of air volume $V_R$ is specified, the system automatically calculates the corresponding diameter d of the drop tube using the following formula:

$$d = 2\sqrt{\frac{V_R}{v_a}},$$

where $v_a$ is the air velocity 13.

Additionally, the dialog contains a drop tube list 21 of ducting parts, selected by the program from a standard ductwork database 51, containing a collation of standard ductwork primitives defining the components required to build the portion of the ducting system pertaining to the respective drop tube 18. The user has the option to add components to this list by pressing an "Add Part" button 22 or delete parts from the list by pressing a "Delete Part" button 23. After acknowledging the "Duct Run Properties" dialog 18 the user can add as many drops 17 to the layout as required by consecutively repeating above routine. The system continuously displays a quote price 24 in the right upper corner of the screen, reporting the cost of the ducting system according to the respective state of the design.

Figure 8:
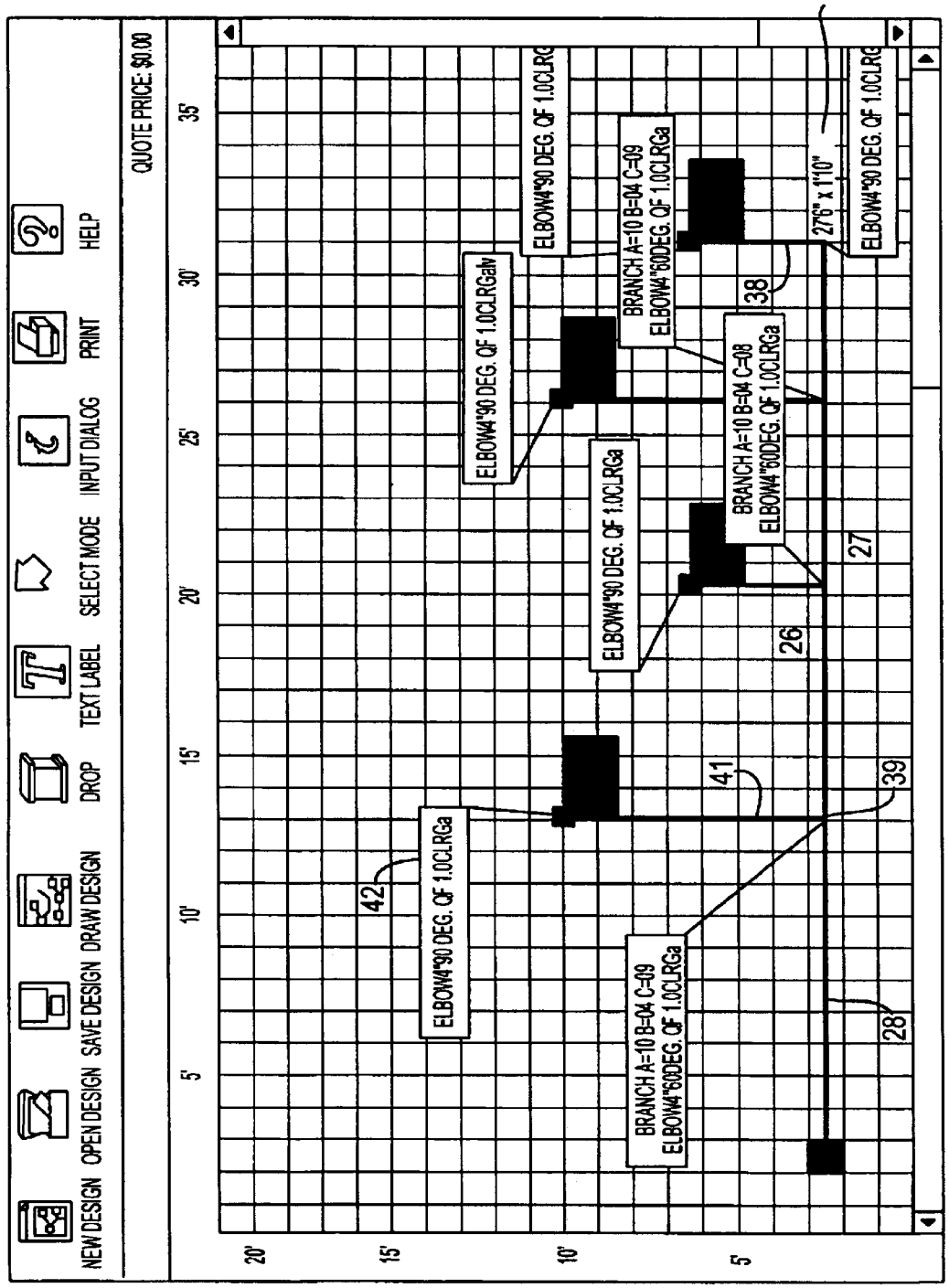
FIG. 8 shows a ducting system layout as displayed by computer software in accordance with the present invention.

After the positions of all terminal connections of the desired ducting system, which are the main terminal location 15 and the drops 17, are defined, the "Draw Design" icon 25, depicted in FIG. 6, is operated, starting a routine of the computer program to determine an optimum configuration of the ducting system providing connections to all terminal connections using optimization criteria. In the course of this process, the system determines an optimum geometric layout 27 of the trunk pipe system 26, as shown in FIG. 8 which trunk pipe system 26 contains straight trunk pipes 28, positioned at the trunk line height 12 above the floor of the installation space, while each of these straight trunk pipes 28 are oriented either parallel to the x-axis or the y-axis, making the layout of the trunk pipe system 26 orthogonal.

Figure 7:
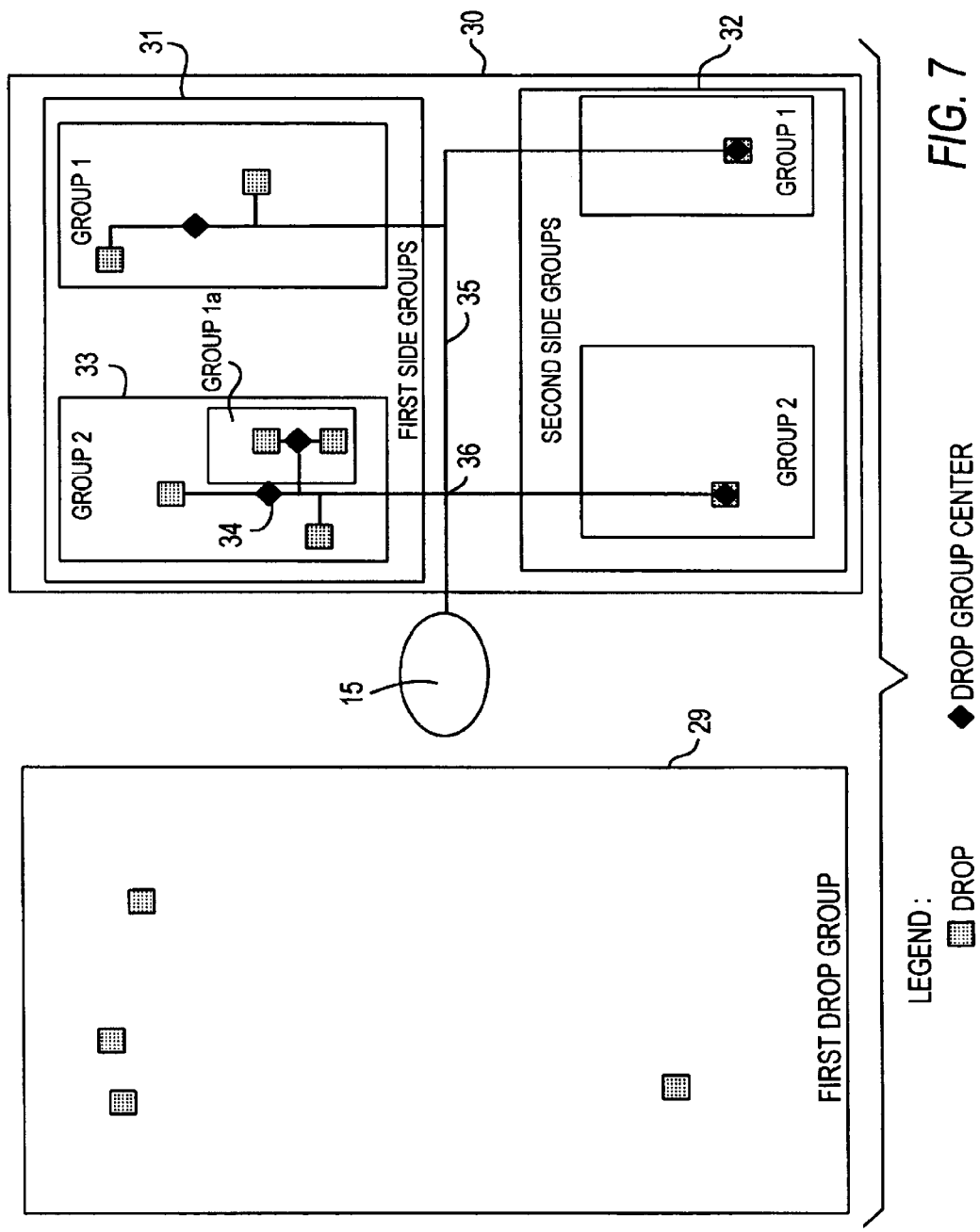
FIG. 7 illustrates the optimization algorithm used by the computer program to determine the optimum layout of the ducting system.

The optimum geometric layout 27 of the trunk pipe system 26 is determined using the following algorithm: As shown in FIG. 7, the drops 17 are first divided into two drop groups, a first drop group 29, containing all drops 17 located left of the main terminal location 15 in the design area 14, and a second drop group 30, containing all drops 17 located right of the main terminal location 15 Within each drop group two side groups are determined, a first side group 31, containing all drops 17 located above the main terminal location 15 in the design area 14, and a second side group 32, containing all drops 17 located below the main terminal location 15.

A subdividing routine for subdividing input groups into at least one output group is then applied to each side group, while the at least one output group is named level 1 group 33, by assigning each drop 17, which is separated from any other drop 17 within the input group by a distance of equal or less than a predetermined parameter, to individual output groups. For each output group a group center coordinate 34 is determined by averaging the coordinates of the individual drops 17 contained in the output group. Said subdividing routine is then applied to the level 1 groups 33, and after that iteratively repeated for the resulting groups of the respective prior routine, as long as a pair of drops 17 separated by less than or equal to a respective parameter value, which is supplied from a list of predetermined parameters of decreasing value, exists.

Next, a layout A of the trunk pipe System 26 is obtained by applying the following routine for laying out the pipelines: First, horizontal pipelines 35 originating from the main terminal location 15 are laid out in both directions, providing branching points 36 to vertical pipelines 37, connecting the level 1 groups 33 to the trunk pipe system 26, while the vertical pipelines 37 are positioned in such way, that their pathways include the group center coordinate 34 of the respective level 1 group 33. From this vertical pipeline 37 an orthogonal pipeline continues, connecting the single drops 17 to the trunk pipe system 26 either directly or via branching points 36 of further group level distribution systems, providing access to the remaining drops 17 via a grid of orthogonal pipelines, while the pathways of these orthogonal pipelines include the group center coordinates 34 of the remaining groups.

Finally, the optimum geometric layout 27 of the trunk pipe system 26 is selected by choosing the layout providing the shorter total length of all pipeline segments between said layout A of said trunk pipe system 26 and layout B obtained by rotating the design area 14 by 90 degrees, configuring the pipes according to said routine for laying out the pipelines, and rotating the design area 14 back by 90 degrees.

Further the system calculates the required diameter $d_{seg}$ of each piping segment 38, piping segments 38 being pipeline sections of the ducting system of constant fluid flow connecting interface points of the ducting system, which are either terminal connections or branching devices 39, using the following formula:

$$d_{seg} = \sqrt{\sum_n d_n^2},$$

where $d_n$ is the diameter of the $n^{th}$ pipeline connected to the piping segment 38, leading on towards the terminal connections. This diameter of each piping segment 38 determines the required diameter of the at least one pipe element 41 contained in each piping segment 38. Additionally, the program determines a parts list 43 of all ducting components required to build the ducting system by selecting them from the standard ductwork database 51.

As shown in FIG. 8, the software subsequently displays the optimum geometric layout 27 of the ducting system, graphical representations of elbow devices 40, each of which is interfacing a pair of pipe elements 41 of different orientations, and graphical representations of branching devices 39, each of which is connecting at least 3 pipe elements 41, and text inserts 42 in the layout, specifying the details of the elbow devices 40 and branching devices 39.

Figure 9:
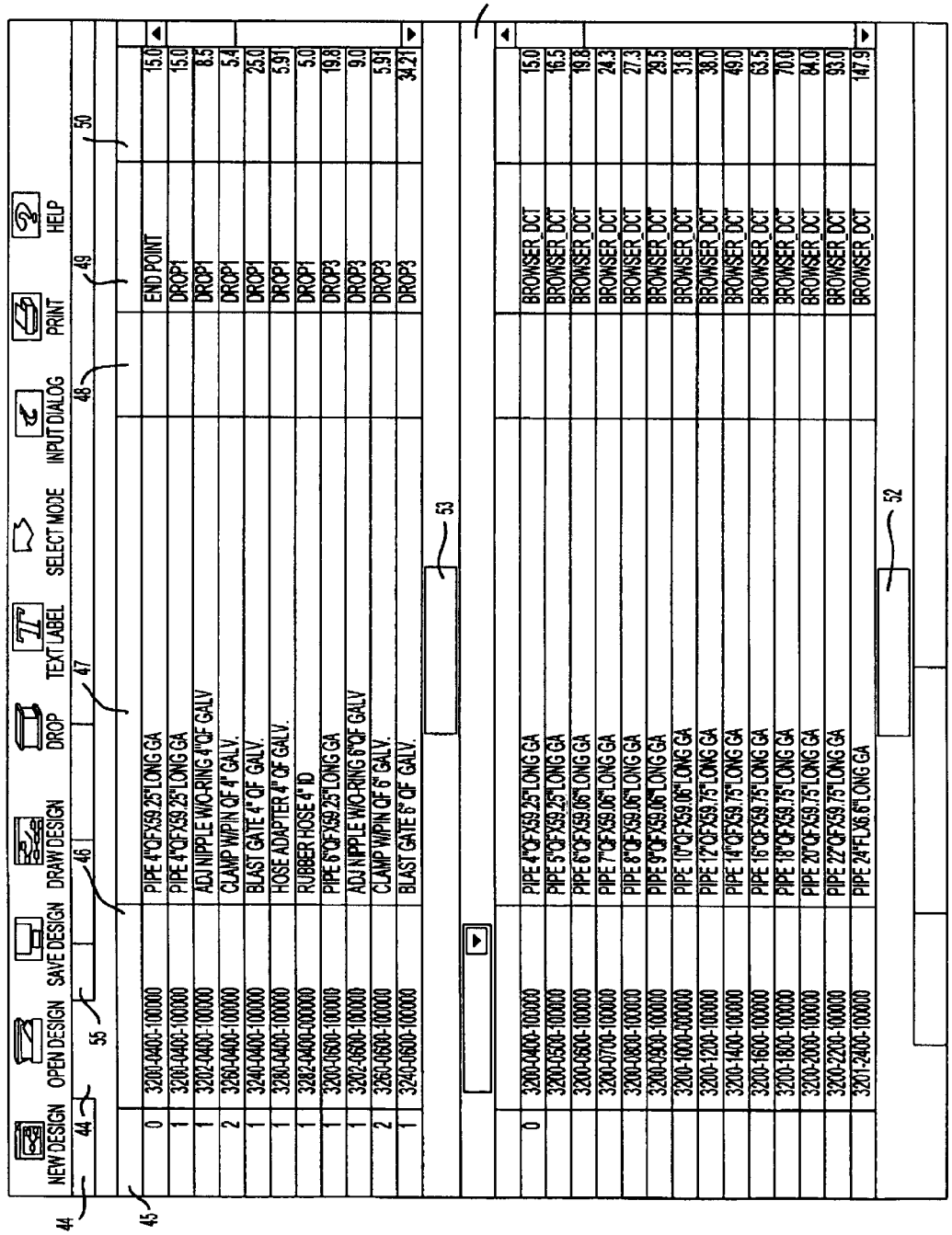
FIG. 9 shows a parts list of a complete ducting system as displayed by computer software in accordance with the present invention.

In order to view the parts list 43, the user needs to click on the pants list tab 44. As shown in FIG. 9, the parts list 43 is then displayed in the upper half of the screen, detailing quantity 45, part number of item 46, item description 47, further details 48, duct run ID 49 and list price 50 for each component required to build the ducting system. The lower half of the screen displays the standard ductwork database 51, detailing the components for assembling the ducting system. Any of those components can be added to the parts list 43 by highlighting them and clicking the "Update Parts List" button 52. Similarly, parts can be taken out of the parts fist 43 via the "Edit Duct Run Parts" button 53. After the pans list 43 has been edited if needed to fit the requirements of the user, the design is saved by clicking on the "Save Design" icon 54.

Figure 10:
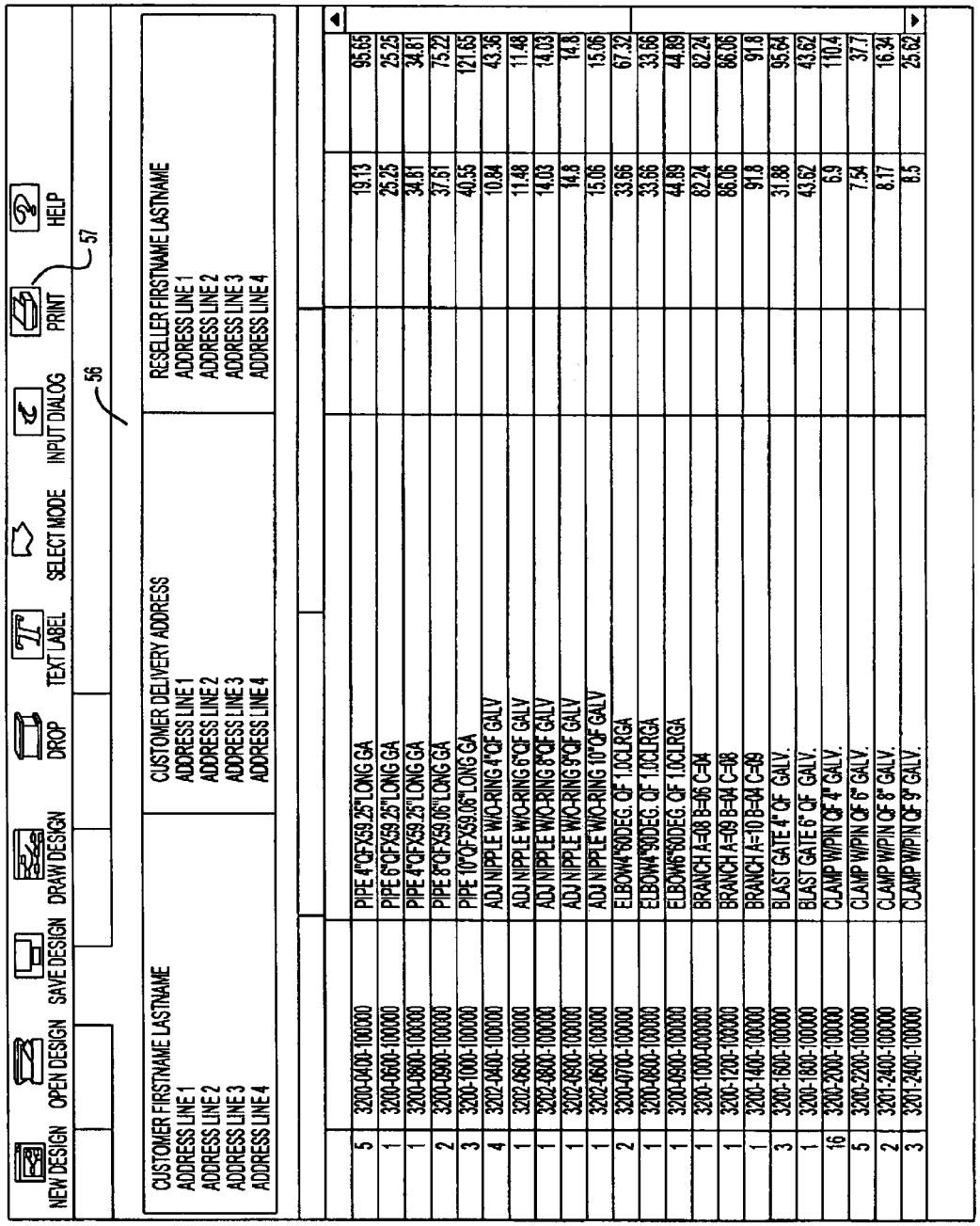
FIG. 10 shows a customer quotation as generated by computer software in accordance with the present invention.

If the user wants to print a customer quotation detailing components and associated installation cost of the respective ducting system, the "Quote" tab 55 needs to be pressed, displaying the quotation screen 56, as shown in FIG. 10. After the required information, specifying customer address and other details on delivery logistics, is entered, the quotation can be printed via a printer peripheral connected to the computer system by clicking on the "Print" icon 57.

The designed ducting system can then instantaneously be ordered from the ducting system manufacturer by pressing the "Purchase Order" tab 58, which is displaying the purchase order screen 69, as shown in FIG. 11. After the required information specifying the details of the recipient and delivery logistics of the ducting system, is entered, the order can be sent to the manufacturer via Internet for instant processing. The "Order Acknowledgement" tab 60 then allows the reseller to print an acknowledgement of the proceed order for the customer.

List of reference numerals

| Reference numeral | Description |
| --- | --- |
| 1 | internet address |
| 2 | language menu |
| 3 | "Design a Ducting System" button |
| 4 | "Order Parts" button |
| 5 | "New Design" icon |
| 6 | "Open Design" icon |
| 7 | "Input Dialog" window |
| 8 | "Welcome Screen" |
| 9 | "Project Input Screen" |
| 10 | length |
| 11 | width |
| 12 | trunk line height |
| 13 | air velocity |
| 14 | design area |
| 15 | main terminal location |
| 16 | "Drop" icon |
| 17 | drop tube location, drop |
| 18 | "Duct Run Properties" dialog |
| 19 | diameter |
| 20 | air volume |
| 21 | drop tube list |
| 22 | "Add Part" button |
| 23 | "Delete part" button |
| 24 | quote price |
| 25 | "Draw Design" icon |

-continued

List of reference numerals

| Reference numeral | Description |
|---|---|
| 26 | trunk pipe system |
| 27 | optimum geometric layout |
| 28 | straight trunk pipe |
| 29 | first drop group |
| 30 | second drop group |
| 31 | first side group |
| 32 | second side group |
| 33 | level 1 group |
| 34 | group center coordinate |
| 35 | horizontal pipeline |
| 36 | branching points |
| 37 | vertical pipeline |
| 38 | piping segment |
| 39 | branching device |
| 40 | elbow device |
| 41 | pipe element |
| 42 | text insert |
| 43 | parts list |
| 44 | parts list tab |
| 45 | quantity |
| 46 | part number of item |
| 47 | item description |
| 48 | further details |
| 49 | duct run ID |
| 50 | list price |
| 51 | standard ductwork database |
| 52 | "Update Parts List" button |
| 53 | "Edit Duct Run Parts" button |
| 54 | "Save Design" icon |
| 55 | "Quote" tab |
| 56 | quotation screen |
| 57 | "Print" icon |
| 58 | "Purchase Order" tab |
| 59 | purchase order screen |
| 60 | "Order Acknowledgement" tab. |

What is claimed is:

1. Method for automating the design of a ducting system for a fluid comprising the steps of entering boundary data (15, 17, 19, 20) identifying boundary conditions of the ducting system, into a data processing system, determining design data (27, 43) by applying an optimization algorithm to said boundary data using said data processing system, which design data comprises an optimum layout (27) of said ducting system in the three dimensional installation space, and having said data processing system communicate the design data (27, 43) to an external recipient, wherein the boundary data comprises positional information (17) in a three dimensional installation space and magnitude of partial fluid flow (19, 20) for each of at least one component terminal connection, through which fluid is exchanged with the ducting system, wherein the fluid flow through said at least one component terminal connection has a common orientation, and positional information (15) in the three dimensional installation space of at least one main terminal connection, through which the total fluid flowing through the at least one component terminal connection is routed, said optimum layout including an identification of all required ducting components (43) for building the ducting system, selected from a collection of standard ductwork primitives (51).

2. Method for automating the design of a ducting system according to claim 1, wherein said boundary data contains a uniform fluid velocity value (13) corresponding to a uniform desired flow speed of the fluid in all parts of the ducting system.

3. Method for automating the design of a ducting system according to claim 1, wherein said boundary data contains information determining said common orientation of the fluid flow through said at least one component terminal connection.

4. Method for automating the design of a ducting system according to claim 1, wherein a required throughput capacity of at least one pipe element (41), which is contained in said required ducting components (43), is calculated by the data processing means considering the position of the pipe element (41) within said optimum layout (27) of the ducting system and the magnitude of said partial fluid flow (19, 20) for each of the at least one component terminal connection, while a uniform flow speed of the fluid in all parts of the ducting system is present.

5. Method for automating the design of a ducting system according to claim 1, wherein said boundary data (15, 17, 19, 20) contains information identifying a z-dimension (12), corresponding to the height of a trunk plane above the floor level of the three dimensional installation space, which floor level is defined by the x- and y-axes of the coordinate system and in which trunk plane a trunk pipe system (26) is configured, which provides connections to one main terminal location (15) and at least one drop (17), which is the location defined by the projection of the at least one component terminal connection along the z-axis into the trunk plane.

6. Method for automating the design of a ducting system according to claim 5, wherein said optimum layout (27) of said ducting system is determined by optimizing the configuration of said trunk pipe system (26), which contains at least one straight trunk pipe (28), wherein the orientations allowed for said at least one straight trunk pipe (28) are restricted to the directions of the x- and the y-axis of the coordinate system.

7. Method for automating the design of a ducting system according to claim 5, wherein said optimization algorithm to determine said optimum layout (27) of said trunk pipe system (26) comprises the steps of:

dividing said drops (17) into two drop groups (29, 30) according to the location of drops (17) relative to said main terminal location (15 in x-direction, dividing each drop group (29, 30) into two side groups (31, 32) according to the location of drops (17) within said drop groups (29, 30) relative to said main terminal location (15) in y-direction, applying a subdividing routine for subdividing input groups into at least one output group to each side group (31, 32), while the output group is named level 1 group (33), by assigning each drop (17) separated from any other drop (17) within the same input group by a distance of equal or less than a predetermined parameter to individual output groups, determining a group center coordinate (34) for each output group by averaging the coordinates of said drops (17) contained in said output group, iteratively applying said subdividing routine to said at least one output group of the respective prior routine, as long as a pair of drops (17) separated by a distance of equal or less than a respective parameter value, which is supplied from a list of predetermined parameters of decreasing value, exists, obtaining a layout A of said trunk pipe system (26) by applying a routine for laying out the pipelines comprising the steps of laying out horizontal pipelines (35) originating from said main terminal location (15) in both directions, providing branching points (36) to vertical pipelines (37), connecting said at least one level 1 group (33) to said trunk pipe system (26), while said vertical pipelines (37) are positioned in such a way, that their pathways include said group center coordinate (34) of said respective level 1 group (33), and adding orthogonal pipelines to said vertical pipelines (37), connecting the single drops (17) to said trunk pipe system (26) either directly or via branching points (36) of further group level distribution systems, providing access to the remaining drops via a grid of orthogonal pipelines, while the pathways of said orthogonal pipelines include said group center coordinates of the remaining groups, selecting said optimum layout (27) of the trunk pipe system (26) by choosing the layout providing the shorter total length of all pipeline segments between said layout A of said trunk pipe system (26) and layout B obtained by rotating the design area (14) by 90 degrees, configuring the pipes according to said routine for laying out the pipelines, and rotating the design area (14) back by 90 degrees.

8. Method for automating the design of a ducting system according to claim 1, wherein said method contains the step of modifying any aspect of said design data (27, 43) through a user interface, if needed, after said design data is determined by the data processing system.

9. Method for automating the design of a ducting system according to claim 1, wherein said step of having the data processing system communicate the design data (27, 43) to an external recipient results in a visual display of the geometry of said optimum layout (27) to scale to the physical layout of the desired ducting system including visualizations of said at least one component terminal connection, of said at least one main terminal connection, of at least one elbow device (40) if required by the layout, each of which is interfacing a pair of pipe elements (41) of different orientations, which pipe elements (43) are contained in said required ducting components (45), and of at least one branching device (39) if required by the layout, each of which is connecting at least three pipe elements (41).

10. Method for automating the design of a ducting system according to claim 9, wherein said step of having the data processing system communicate the design data (27, 43) to an external recipient results in the visual display of a list (43) of said required ducting components including their prices (50), which list is based on said visual display of the optimum layout (27).

11. Method for automating the design of a ducting system according to claim 1, wherein said method can be utilized via the Internet through the use of web browsing software.

12. Means for automating the design of a ducting system for a fluid comprising data entry means, data processing means applying optimization criteria in order to determine design data (27, 43) comprising an optimum layout (27) of said ducting system in the three dimensional installation space, and data output means, communicating said design data (27, 43) to an external recipient, wherein said data entry means are used to identify positional information (17) in a three dimensional installation space and magnitude of partial fluid flow (19, 20) for each of at least one component terminal connection, through which fluid is exchanged with the ducting system, wherein the fluid flow through said at least one component terminal connection has a common orientation, and positional information (15) in the three dimensional installation space of at least one main terminal connection, through which the total fluid flowing through the at least one component terminal connection is routed, the means for automating the design of a ducting system for a fluid further comprises a standard ductwork data base (51) containing a collection of standard ductwork primitives, said optimum layout (27) including an identification of all required ducting components (43) for building the ducting system, selected from a collection of standard ductwork primitives (51).

13. Means for automating the design of a ducting system according to claim 12, wherein said data entry means are used to identify a uniform fluid velocity value (13) corresponding to a uniform desired flow speed of the fluid in all parts of the ducting system.

14. Means for automating the design of a ducting system according to claim 12, wherein said data entry means are used to identify said common orientation of the fluid flow through said at least one component terminal connection.

15. Means for automating the design of a ducting system according to claim 12, wherein a required throughput capacity of at least one pipe element (41), which is contained in said required ducting components (43), is calculated by the data processing means considering the position of the pipe element (41) within said optimum layout (27) of the ducting system, the magnitude of said partial fluid flow (19,20) for each of the at least one component terminal connection, while a uniform flow speed of the fluid in all parts of the ducting system is present.

16. Means for automating the design of a ducting system according to claim 12, wherein said data entry means are used to identify a z-dimension (12), corresponding to the height of a trunk plane above the floor level of the three dimensional installation space, which floor level is defined by the x- and y-axes of the coordinate system and in which trunk plane a trunk pipe system (26) is configured, which provides connections to one main terminal location (15) and at least one drop (17), which is the location defined by the projection of the at least one component terminal connection along the z-axis into the trunk plane.

17. Means for automating the design of a ducting system according to claim 16, wherein said data processing means determine said optimum layout (27) of said ducting system by optimizing the configuration of said trunk pipe system (26), which contains at least one straight trunk pipe (28), wherein the orientations allowed for said at least one straight trunk pipe (28) are restricted to the directions of the x- and the y-axis of the coordinate system.

18. Means for automating the design of a ducting system according to claim 16, wherein said optimization criteria used to determine said optimum layout (27) of said trunk pipe system (26) are based on an algorithm comprising the steps of:

dividing said drops (17) into two drop groups (29, 30) according to the location of drops (17) relative to said main terminal location (15 in x-direction, dividing each drop group (29, 30) into two side groups (31, 32) according to the location of drops (17) within said drop groups (29, 30) relative to said main terminal location (15) in y-direction, applying a subdividing routine for subdividing input groups into at least one output group to each side group (31, 32), while the output group is named level 1 group (33), by assigning each drop (17) separated from any other drop (17) within the same input group by a distance of equal or less than a predetermined parameter to individual output groups, determining a group center coordinate (34) for each output group by averaging the coordinates of said drops (17) contained in said output group, iteratively applying said subdividing routine to said at least one output group of the respective prior routine, as long as a pair of drops (17) separated by a distance of equal or less than a respective parameter value, which is supplied from a list of predetermined parameters of decreasing value, exists, obtaining a layout A of said trunk pipe system (26) by applying a routine for laying out the pipelines comprising the steps of laying out horizontal pipelines (35) originating from said main terminal location (15) in both directions, providing branching points (36) to vertical pipelines (37), connecting said at least one level 1 group (33) to said trunk pipe system (26), while said vertical pipelines (37) are positioned in such a way, that their pathways include said group center coordinate (34) of said respective level 1 group (33), and adding orthogonal pipelines to said vertical pipelines (37), connecting the single drops (17) to said trunk pipe system (26) either directly or via branching points (36) of further group level distribution systems, providing access to the remaining drops via a grid of orthogonal pipelines, while the pathways of said orthogonal pipelines include said group center coordinates of the remaining groups, selecting said optimum layout (27) of the trunk pipe system (26) by choosing the layout providing the shorter total length of all pipeline segments between said layout A of said trunk pipe system (26) and layout B obtained by rotating the design area (14) by 90 degrees, configuring the pipes according to said routine for laying out the pipelines, and rotating the design area (14) back by 90 degrees.

19. Means for automating the design of a ducting system according to claim 12, wherein said means comprise a user interface, used to modify any aspect of said design data (27, 43), if needed.

20. Means for automating the design of a ducting system according to claim 12, wherein said data output means visually display the geometry of said optimum layout (27) to scale to the physical layout of the desired ducting system including visualizations of said at least one component terminal connection, of said at least one main terminal connection, of at least one elbow device (40) if required by the layout, each of which is interfacing a pair of pipe elements (41) of different orientations, which pipe elements (41) are contained in said required ducting components (43), and of at least one branching device (39) if required by the layout, each of which is connecting at least three pipe elements (41).

21. Means for automating the design of a ducting system according to claim 20, wherein said data output means visually display of a list (43) of said required ducting components including their prices (50), which list is based on said visual display of the optimum layout (27).

22. Means for automating the design of a ducting system according to claim 12, wherein said means can be utilized via the Internet through the use of web browsing software.

* * * * *